United States Patent [19]

Washizuka et al.

[11] Patent Number: 4,740,913

[45] Date of Patent: Apr. 26, 1988

[54] ORNAMENTAL DISPLAY DEVICE FOR ELECTRONIC DICTIONARY

[75] Inventors: Isamu Washizuka; Mitsuhiro Saiji, both of Soraku, Japan

[73] Assignee: Sharp Kabushiki Kaisha, Osaka, Japan

[21] Appl. No.: 892,900

[22] Filed: Aug. 4, 1986

Related U.S. Application Data

[63] Continuation of Ser. No. 506,985, Jun. 23, 1983, abandoned.

[30] Foreign Application Priority Data

Jun. 25, 1982 [JP] Japan .................................. 57-110234

[51] Int. Cl.⁴ .............................................. G06F 15/38
[52] U.S. Cl. .................................... 364/900; 364/419; 364/710; 434/157
[58] Field of Search ........................................ 235/379; 364/200 MS File, 900 MS File, 188, 408, 419, 710, 409, 709; 434/156, 157

[56] References Cited

U.S. PATENT DOCUMENTS

| 4,173,832 | 11/1979 | Chen et al. ..................... 434/335 X |
| 4,305,131 | 12/1981 | Best ................................. 364/410 X |
| 4,360,345 | 11/1982 | Hon .................................. 434/307 X |
| 4,373,192 | 2/1983 | Yanagiuchi ...................... 364/900 |
| 4,403,966 | 9/1983 | Yang ............................... 434/169 X |
| 4,438,326 | 3/1984 | Uchida ............................ 364/408 X |

Primary Examiner—Gary V. Harkcom
Assistant Examiner—David L. Clark
Attorney, Agent, or Firm—Birch, Stewart, Kolasch & Birch

[57] ABSTRACT

A display device for an electronic dictionary such as an electronic translator or an electronic language dictionary is featured by displaying ornamental patterns formed with ornamental data and word data when the dictionary is left unoperated. The display device includes a memory circuit for storing the ornamental data and the word data, a mixing circuit responsive to the memory circuit for mixing the ornamental data and the word data, and a display responsive to the mixing circuit for displaying the mixed ornamental patterns. In a specific form of the present invention, the ornamental patterns are displayed by shifting or running the overall data across the display.

5 Claims, 3 Drawing Sheets

ORNAMENTAL DISPLAY DEVICE FOR ELECTRONIC DICTIONARY

This is a continuation of application Ser. No. 506,985, filed June 23, 1983 and now abandoned.

BACKGROUND OF THE INVENTION

The present invention relates to an electronic dictionary and, more particularly, to a display device for an electronic dictionary.

A conventional display device for an electronic dictionary is disclosed in Yanagiuchi et al. U.S. Pat. No. 4,373,192, issued on Feb. 8, 1983, entitled "DISPLAY DEVICE FOR AN ELECTRONIC LANGUAGE INTERPRETER", and assigned to the same assignee. The essence of Yanagiuchi et al. is that, when the display data length exceeds the capacity of digits contained within a display device, the display data are displayed with a shifting or running of the overall data on the display device by separating the display data according to the presence of a particular mark such as a comma, a part of speech etc. allotted in a certain portion of the display data.

The disclosure of this U.S. Pat. No. 4,373,192 is incorporated herein by reference.

In connection with the use of the display device, it may be desired that the display device, when not being used for an electronic dictionary, be used for displaying ornamental symbols or for showing that the electronic dictionary is not being operated.

SUMMARY OF THE INVENTION

Accordingly, it is an object of the present invention to provide an improved display device in an electronic dictionary for displaying ornamental symbols when the electronic dictionary is not operated as a dictionary.

It is another object of the present invention to provide an improved display device in an electronic dictionary for indicating that the electronic dictionary is not being operated.

Briefly described, in accordance with the present invention, a display device for an electronic dictionary such as an electronic translator, is provided wherein the display device displays ornamental patterns having word data or description data when the electronic dictionary is left unoperated. The word data are used in the electronic translator or the electronic dictionary for translating words in response to the input of one or more entry words. The description data are obtained by the electronic language dictionary in response to the input of one or more entry words. The display device includes a memory for storing the ornamental data, the word data, and the description data, a mixing circuit responsive to the memory for mixing the ornamental data and either the word data or the description data, and a display, responsive to the mixing circuit, for displaying the mixed data.

In a specific form of the present invention, the ornamental patterns are displayed with shifting or running of the overall data on the display device.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

Figure 1:
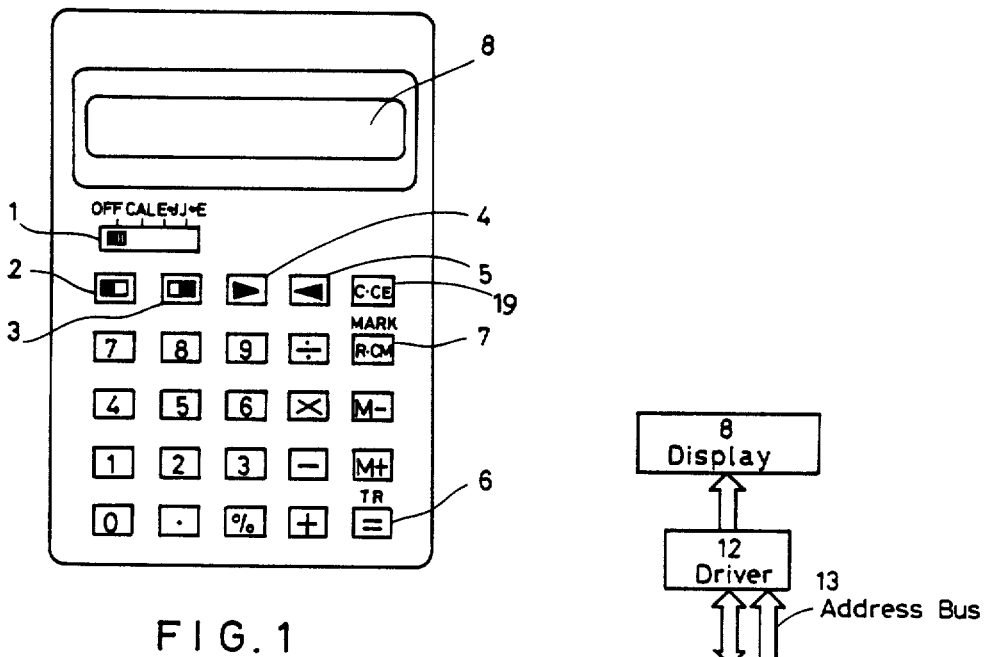
FIG. 1 shows a plan view of an electronic dictionary according to the present invention.

FIG. 1 shows an electronic dictionary according to the present invention. Although the device of FIG. 1 is an electronic translator for translating one or more first words in a first language into one or more second words in a second language, it may be possible that another type of dictionary, such as an electronic language dictionary for outputting description word data in a language in response to the input of one or more entry words in the same language, can be used.

The electronic dictionary of FIG. 1 performs as an electronic calculator and an electronic translator for translating English to Japanese and vice versa.

The electronic dictionary of FIG. 1 comprises a mode selector 1, a first-letter forward search key 2, a second-letter forward search key 3, an alphabet input and entry-word forward search key 4, a backward search key 5, a translation key 6, a mark key 7, and a liquid crystal display 8.

The mode selector 1 is slidable to select one of a power off mode, a calculator mode, an English to Japanese translation mode, or a Japanese to English translation mode. The position for selecting the English to Japanese translation mode is denoted as "E→J" in FIG. 1. The position for selecting the Japanese to English translation mode is denoted as "J→E" in FIG. 1.

In the English to Japanese translation mode, the first-letter forward search key 2 continues to be operated or is repetitively actuated to subsequently display English letters of the alphabet at the top digit of the display 8 in English alphabetical order. In the Japanese to English translation mode, this key 2 continues to be operated or is repetitively operated to subsequently display the Japanese letters of the alphabet ("katakana(s)") at the top digit of the display 8 in Japanese alphabetical order.

In the English to Japanese translation mode, the second-letter forward search key 3 continues to be operated or is repetitively operated to subsequently display the English letters of the alphabet at the second digit from the top of the display 8 in English alphabetical order. In the Japanese to English translation mode, this key 3 continues to be operated or is repetitively operated to subsequently display the Japanese letters of the alphabet ("katakana(s)") at the second digit from the top of the display 8 in the Japanese alphabetical order. Signs for a voiced sound, a semi-voiced sound, and a long vowel follow the Japanese letters when the second-letter forward search key 3 continues to be operated or is repetitively operated.

In the English to Japanese translation mode or the Japanese to English translation mode, the first-letter forward search key 2, the second-letter forward search key 3, or the backward search key 5 is operated to select a specific letter or letters. Thereafter, the letter input and entry word forward search key 4 is operated to input the selected letter or letters into a retrieval circuit of the electronic dictionary as one or more entry words.

Responsive to such an operation of this key 4, a first English word (in the English to Japanese translation mode) or a first Japanese word (in the Japanese to English translation mode) is retieved which leads a group of words starting with the thus selected letter or letters in the English alphabetical order (in the English to Japanese translation mode) or in Japanese alphabetical order (in the Japanese to English translation mode). The retrieved first English or Japanese word is displayed in the display 8.

When this key 4 continues to be operated or is repetitively operated, a plurality of English words (in the English to Japanese translation mode) or a plurality of Japanese words (in the Japanese to English translation mode) are outputted from a memory of the circuit and displayed in the display 8 in English alphabetical order or Japanese alphabetical order.

While the first-letter and the second-letter forward search keys 2 and 3, and any other keys are not operated to select a specific letter or letters, the key 4 is operated to subsequently retrieve and display the English words (in the English to Japanese translation mode) or the Japanese words (in the Japanese to English translation mode) in English alphabetical order or Japanese alphabetical order, respectively, from the first word to subsequent ones.

Before the second-letter forward search key 3 is operated, the backward search key 5 is operated to search the first letters of the words in a direction reverse to the alphabetical order. After the second-letter forward search key 3 is operated and before the letter input and entry word forward search key 4 is operated, the backward search key 5 is operated to search the second letters of the words in the reverse direction. After the letter input and entry word forward search key 4 is operated, the backward search key 5 is operated to search entry words in the reverse direction.

The translation key 6 is operated to translate the selected words according to the translation modes selected. After the key 4 or 5 is operated to select any English or Japanese word, the translation key 6 is operated to translate the selected word and display the translated word in the display 8. In the calculator mode, this key 6 is operated as an equal key.

The mark key 7 is operated to mark selected words and retrieve the marked words in the translation modes. In the calculator mode, this key 7 is operated as a memory recall/memory clear key "R.CM".

A clear/clear entry key 19 labeled "C.CE" is operated to cancel input word information in the translation modes and input digit information in the calculator mode, either totally or partially.

Figure 2:
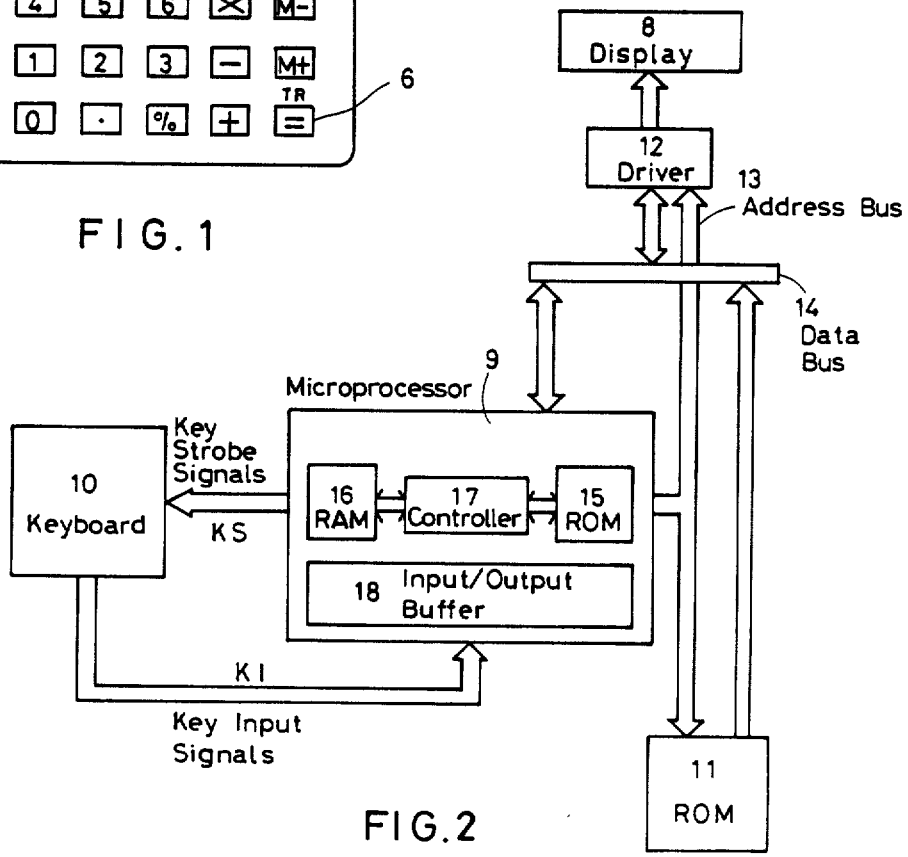
FIG. 2 shows a schematic block diagram of a circuit implemented within the electronic dictionary of FIG. 1.

FIG. 2 shows a schematic block diagram of a circuit implemented within the dictionary of FIG. 1.

The circuit of FIG. 2 includes the display 8, a microprocessor 9, a keyboard 10, a ROM 11, and a driver 12. An address bus 13 and a data bus 14 are also provided.

The microprocessor 9 develops key strobe signals KS toward the keyboard 10 and receives key input signals KI from the keyboard 10 to detect the operations of the key switches in the keyboard 10. The keyboard 10 contains the key switches as shown in FIG. 1. The microprocessor 10 selects an address of the ROM 11 to read in the contents of the selected address.

The microprocessor 9 comprises a ROM 15, a RAM 16, a controller 17 and an input/output buffer 18. An inner bus is provided for interconnecting the ROM 15, the RAM 16, the controller 17, and the input/output buffer 18. The ROM 15 stores a control program. The RAM 16 provides registers, flags, and timer devices, etc. The controller 17 serves to control calculation operations.

The ROM 11 stores a great number of English words and Japanese words used for the translation modes in the same manner as disclosed in U.S. Pat. No. 4,373,192.

The driver 12 is responsive to display pattern information provided by the microprocessor 9 for controlling illumination of the dots in the display 8. According to the present invention, the driver 12 includes a memory for storing display and erase information corresponding to the dots of the display 8. Once display information is sent into the memory of the driver 12 by the microprocessor 9, the driver 12 continues to develop the sent display information toward the display 8 before new display information is sent by the microprocessor 9.

Figure 3:
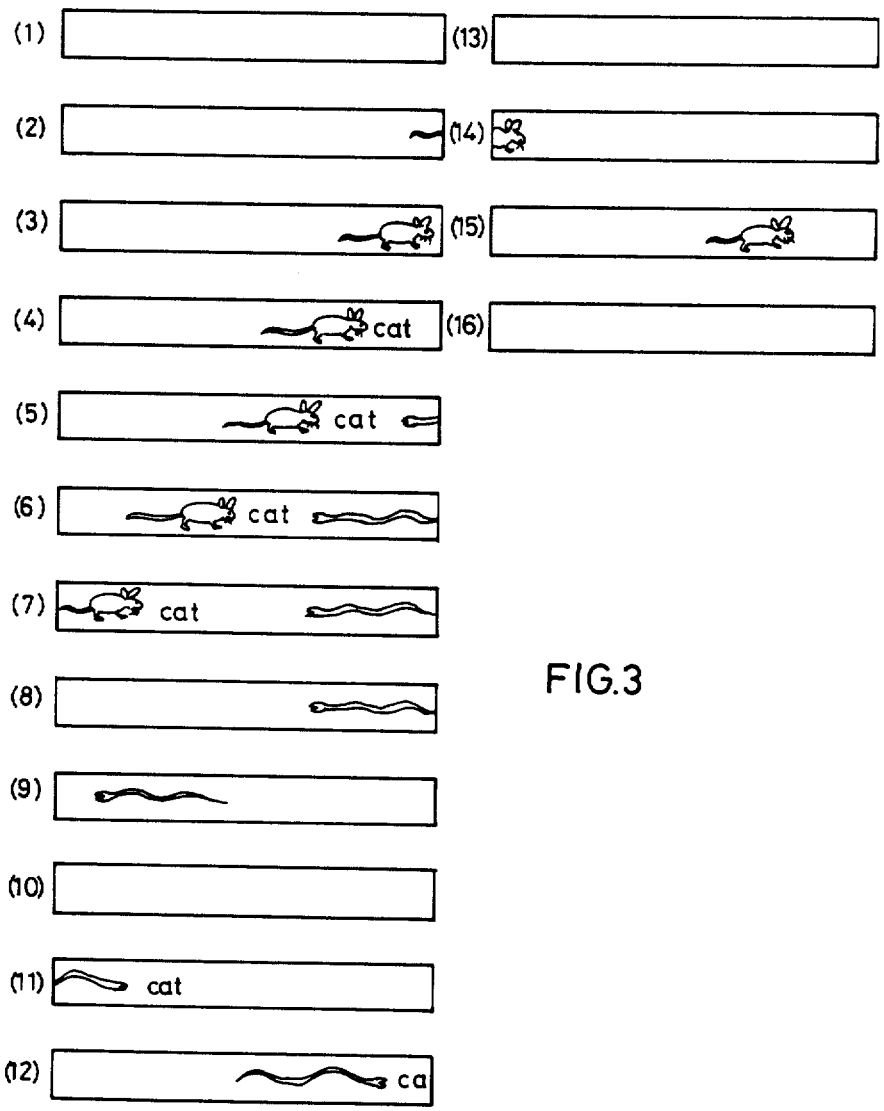
FIG. 3 shows display examples for illustrating the operation of a display device of the electronic dictionary of the present invention.

FIG. 3 shows display examples of the display 8 in the case where the electronic dictionary is left unoperated in the translation modes for a predetermined time. In these display examples, ornamental patterns formed or generated by the microprocessor with the marked words are displayed. The display items (1) to (16) form a single display cycle as follows:

Items (1) to (4): A rat symbol appears from the right side digit and is accompanied by an English word "cat".

Items (5) and (6): The English word "cat" is accompanied by a snake symbol. The rat symbol, the English word, and the snake symbol are all shifted or run toward the left in the same manner as is disclosed in U.S. Pat. No. 4,373,192.

Items (7) and (8): The snake symbol is left far from the rat symbol and the English word.

Items (9) to (13): The snake symbol moves in the reverse direction toward the English word.

Items (14) to (16): The rat symbol returns to chase the English word "cat".

Following item (16), display item (2) is reselected, and the English word selected to be displayed with the animal symbol is changed.

It may be evident that the animal symbols such as the rat symbol, the snake symbol etc. can be replaced by any other ornamental patterns.

Figure 4:
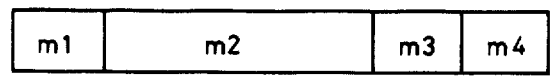
FIG. 4 shows a structure of a memory as connected in the circuit of FIG. 3.

FIG. 4 shows a structure of the driver 12 in the circuit of FIG. 3.

The driver 12 includes four memory locations m1 to m4. The second memory location m2 and the third memory location m3 are provided for storing display information which must be displayed in the display 8. The first memory location m1 and the fourth memory location m4 are provided for storing partial display information for showing the partial symbols at the right side or the left side digits in the display 8.

Figure 5:
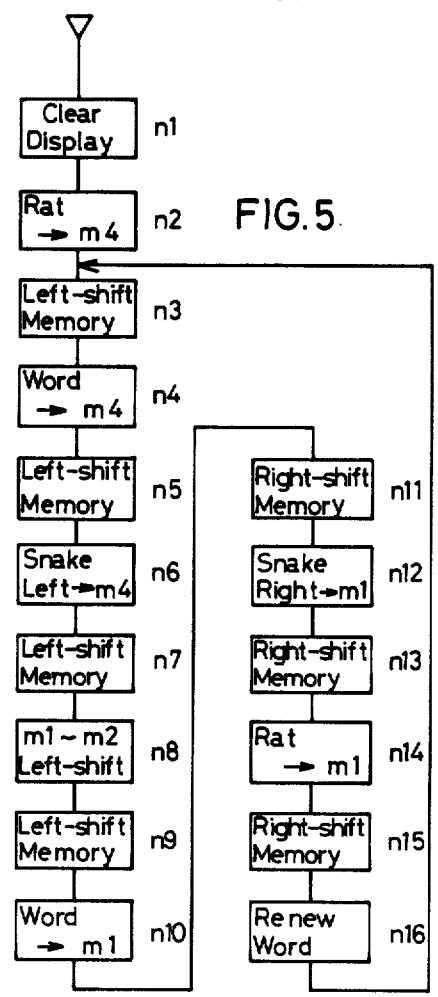
FIG. 5 shows a flow chart of the operation of the electronic dictionary according to the present invention.

FIG. 5 shows a flow chart of the electronic dictionary operation according to the present invention.

Steps n1 and n2: All the memory locations m1 to m4 are cleared to cancel the display, so that the rat symbol is input into the fourth memory location m4. In this stage, the rat symbol is not displayed.

Step n3: The memory contents are subsequently shifted left, to thereby display the rat symbol from the right side digits as referred to FIG. 3-(1) to -(3).

Step n4: A word is entered into the fourth memory location m4. This word is selected to have some serial number of the words previously marked by the mark key 7.

It may be possible that any word including the original language words and the translated language words for the translations other than the marked words can be selected as this entered word.

Step n5: The contents of the memory locations of the driver 12 are subsequently shifted left, so that the display of the marked word at the right side digit follows the display of the rat symbol as referred to in FIG. 3-(4).

Step n6: The snake symbol directed left is entered into the fourth memory location m4.

Step n7: The contents of the memory locations are subsequently shifted left. The snake symbol follows the display of the marked word at the right side digits as referred to in FIG. 3-(5) and -(6).

In the stage of FIG. 3-(6), the third memory location m3 stores ornamental display information for the snake symbol. The second memory location m3 stores the display information for the rat symbol and the marked word.

Step n8: The contents of the first memory location m1 and the second memory location m2 are subsequently shifted, so that the rat symbol and the marked word are shifted left and the snake symbol is left unmoved as referred to in FIG. 3-(8) to -(10).

Step n10: The same marked word is entered into the first memory location m1.

Step n11: The contents of the memory locations are shifted to the right.

Step n12: When the marked word appears at the left side digit, the snake symbol directed to the right is entered into the first memory location m1.

Step n13: The right shift operations continue to enable the display items as referred to FIG. 3-(11) to in -(13), in which the snake symbol appears at the left side digits, traverses the digits of the display 8, and disappears from the right side digits.

Step n14: The rat symbol is further entered into the first memory location m1.

Step n15: The contents of the memory locations are shifted right, so that the rat symbol appears at the left side digits, traverses the digits of the display 8, and dispppears from the right side digits, as referred to in FIG. 3-(14) to -(16).

In this manner, a single display cycle has been completed.

Step n16: A subsequent marked word is recalled, which is to be displayed at the next display item cycle. Thus, a different marked word is displayed to be disposed between the rat symbol and the snake symbol for each display item cycle.

In the above preferred embodiment, a timer circuit may be provided in the RAM 16 for counting an elapsed time after the electronic dictionary is left unoperated to automatically start displaying the ornamental display items.

It may be possible that a specific command key is provided for initiating display of the ornamental display items.

When the electronic language dictionary is applied to the present invention, it may be possible for the marked words, the original language words, and the translated words used by the electronic translator to be mixed by the driver 12 and replaced by the description data used for the electronic language dictionary.

While only certain embodiments of the present invention have been described, it will be apparent to those skilled in the art that various changes and modifications may be made therein without departing from the spirit and scope of the present invention as claimed.

What is claimed is:

1. A display device in an electronic translator which displays translated word data in a second language in response to a keyboard input of corresponding original word data in a first language, said display device comprising:

memory means for storing ornamental data, said translated word data, and said corresponding input original word data, said ornamental data including at least one animal symbol;

mixing means, connected to said memory means, for generating mixed data, said mixed data including either of said original input word data or said translated word data being positioned adjacent said at least one animal symbol;

detection means, responsive to the input of said original word data, for detecting when the electronic translator has been idle for a predetermined period of time and for generating a mixed data display signal in response thereto; and display means, responsive to said mixed data display signal, for displaying said mixed data generated by said mixing means, said display means being alternatively responsive to the input of said original word data for displaying said translated word data.

2. The device of claim 1, wherein said ornamental data include a plurality of animal symbols and wherein said mixing means generates mixed data including either of said original input word data or said translated word data which is positioned between at least two of said plurality of animal symbols.

3. The device of claim 1, wherein said mixed data is displayed by shifting the overall data across said display means.

4. The device of claim 1, wherein said mixing means comprises a driver circuit for driving said display means.

5. The device of claim 4, wherein said mixing means further comprises first memory means for storing said mixed data to be fully displayed in said display means and second memory means for storing partial display information to be partially displayed in said display means, wherein said partial display information includes half of said mixed data.

* * * * *